United States Patent
Mendelowitz et al.

(10) Patent No.: US 12,081,990 B2
(45) Date of Patent: Sep. 3, 2024

(54) SYSTEMS AND METHODS FOR BLUETOOTH AUTHENTICATION USING COMMUNICATION FINGERPRINTING

(71) Applicant: Red Bend Ltd., Hod Hasharon (IL)

(72) Inventors: Shachar Mendelowitz, Tel Aviv (IL); Ori Goldberg, Kiryat Ono (IL); David Reikher, Beer Sheva (IL)

(73) Assignee: RED BEND LTD., Hod Hasharon (IL)

( * ) Notice: Subject to any disclaimer, the term of this patent is extended or adjusted under 35 U.S.C. 154(b) by 0 days.

(21) Appl. No.: 17/443,944

(22) Filed: Jul. 28, 2021

(65) Prior Publication Data
US 2022/0038909 A1 Feb. 3, 2022

Related U.S. Application Data

(60) Provisional application No. 63/058,366, filed on Jul. 29, 2020.

(51) Int. Cl.
 *H04W 12/50* (2021.01)
 *H04W 4/80* (2018.01)
 *H04W 12/06* (2021.01)
 *H04W 76/10* (2018.01)

(52) U.S. Cl.
 CPC ............ *H04W 12/50* (2021.01); *H04W 4/80* (2018.02); *H04W 12/06* (2013.01); *H04W 76/10* (2018.02)

(58) Field of Classification Search
 CPC ..................................................... H04W 4/80
 See application file for complete search history.

(56) References Cited

U.S. PATENT DOCUMENTS

| | | | | |
|---|---|---|---|---|
| 2007/0025265 | A1 | 2/2007 | Porras et al. | |
| 2011/0320535 | A1* | 12/2011 | Donaldson | H04W 12/50 709/204 |
| 2013/0189953 | A1* | 7/2013 | Mathews | G01S 5/02521 455/411 |
| 2014/0380424 | A1* | 12/2014 | Thompson | H04W 12/06 726/4 |

(Continued)

FOREIGN PATENT DOCUMENTS

| | | |
|---|---|---|
| JP | 2013532435 A | 8/2013 |
| JP | 2020058037 A | 4/2020 |

OTHER PUBLICATIONS

European Patent Office, Extended European Search Report Issued in Application No. 21186405.3, Nov. 30, 2021, Germany, 6 pages.

(Continued)

*Primary Examiner* — Wen W Huang
(74) *Attorney, Agent, or Firm* — McCoy Russell LLP

(57) ABSTRACT

Systems and methods for verifying wireless connections are provided. In one example, a method includes, at a computing system, responsive to initiating a wireless connection between a client device and a host device, generating a communication fingerprint of the client device based on at least one response characteristic of the client device, the at least one response characteristic based on a communication between the client device and the host device, the communication passing through each of a software layer of the client device and a hardware element of the client device. In this way, overall system security of a wireless connection between the host device and the client device may be increased.

15 Claims, 6 Drawing Sheets

(56) References Cited

U.S. PATENT DOCUMENTS

| | | | |
|---|---|---|---|
| 2015/0080021 A1* | 3/2015 | Bietz | H04B 1/3877 |
| | | | 455/575.8 |
| 2016/0094947 A1* | 3/2016 | Shen | G01S 5/0278 |
| | | | 455/456.1 |
| 2016/0366586 A1 | 12/2016 | Gross et al. | |
| 2019/0110196 A1* | 4/2019 | Simileysky | H04W 4/80 |
| 2019/0377854 A1* | 12/2019 | Mehedy | G06F 3/0488 |
| 2019/0384956 A1 | 12/2019 | Whelan, III et al. | |
| 2020/0036710 A1 | 1/2020 | Khanna et al. | |
| 2021/0282016 A1* | 9/2021 | Mohan | H04L 63/1458 |

OTHER PUBLICATIONS

Japanese Patent Office, Office Action Issued in Application No. 2021-109897, Apr. 30, 2024, 13 pages.

* cited by examiner

SYSTEMS AND METHODS FOR BLUETOOTH AUTHENTICATION USING COMMUNICATION FINGERPRINTING

CROSS REFERENCE TO RELATED APPLICATIONS

The present application claims priority to U.S. Provisional Application No. 63/058,366, entitled "Systems and Methods for Bluetooth Authentication Using Communication Fingerprinting", and filed on Jul. 29, 2020. The entire contents of the above-listed application are hereby incorporated by reference for all purposes.

FIELD

The present disclosure generally relates to authenticating wireless connections between Bluetooth-enabled devices.

BACKGROUND

Bluetooth connections may be used to enable wireless connections between devices. For example, a host device may connect wirelessly to a client device via a Bluetooth connection in order to exchange data. As an example, the host device may include a speaker, the client device may stream music to the host device, which may be played via the speaker of the host device. As another example, the host device may have one or more settings, which may be adjusted via the client device. Further, the Bluetooth protocol may include authentication. However, in some examples, an unauthorized entity may clone the client device and attempt to connected the cloned device to the host device. For example, a cloned device may present to the host device with similar identifiers to the client device. For example, by cloning the client device, a connection between the client device and the host device may be interrupted, and system security may be decreased. Systems and methods are desired for distinguish between the client device and a cloned device.

SUMMARY

Embodiments are disclosed for a method, comprising: at a computing system, responsive to initiating a wireless connection between a client device and a host device, generating a communication fingerprint of the client device based on at least one response characteristic of the client device, the at least one response characteristic based on a communication between the client device and the host device, the communication passing through each of a software layer of the client device and a hardware element of the client device.

In another embodiment, a method for a computing system comprises: responsive to initiating a Bluetooth connection between a client device and a host device, determining whether a saved communications fingerprint for the client device is stored in a memory of the computing system; responsive to determining that the saved communications fingerprint for the client device is not stored in the memory of the computing system, generating a new communications fingerprint for the client device based on response characteristics of the client device and storing the new communications fingerprint in the memory of the computing system; responsive to determining that the saved communications fingerprint for the client device is stored in the memory of the computing system, comparing response characteristics of the client device to the saved communications fingerprint; and responsive to determining that the response characteristics of the client device do not match the saved communications fingerprint, terminating the Bluetooth connection with the client device.

In another embodiment, a computing system comprises a Bluetooth stack including an RF layer and an application layer; a processor communicatively coupled to the computing system; and a storage device storing instructions executable by the processor to: responsive to initiating a Bluetooth connection with a client device, generate a first communications fingerprint for the client device based on response characteristics of the client device.

In this way, a client device may be verified by a host device in order to decrease an incidence of cloned devices establishing a connection with a host device, which may increase system security. As an example, the host device is an in-vehicle infotainment system of a vehicle, and the client device is a mobile device of a user of the vehicle. During a first connection between the host device and the client device, the host device may generate a fingerprint for the client device based on response characteristics of the client device. Thus, during a subsequent reconnection with the client device, the host device may compare response characteristics to the saved fingerprint of the client device in order to verify that the client device is authentic, and the host device may prevent inauthentic devices from connecting. Therefore, Bluetooth connection security may be increased, inauthentic connections may be decreased, and overall customer satisfaction may be increased.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION OF THE DRAWINGS

Figure 1:
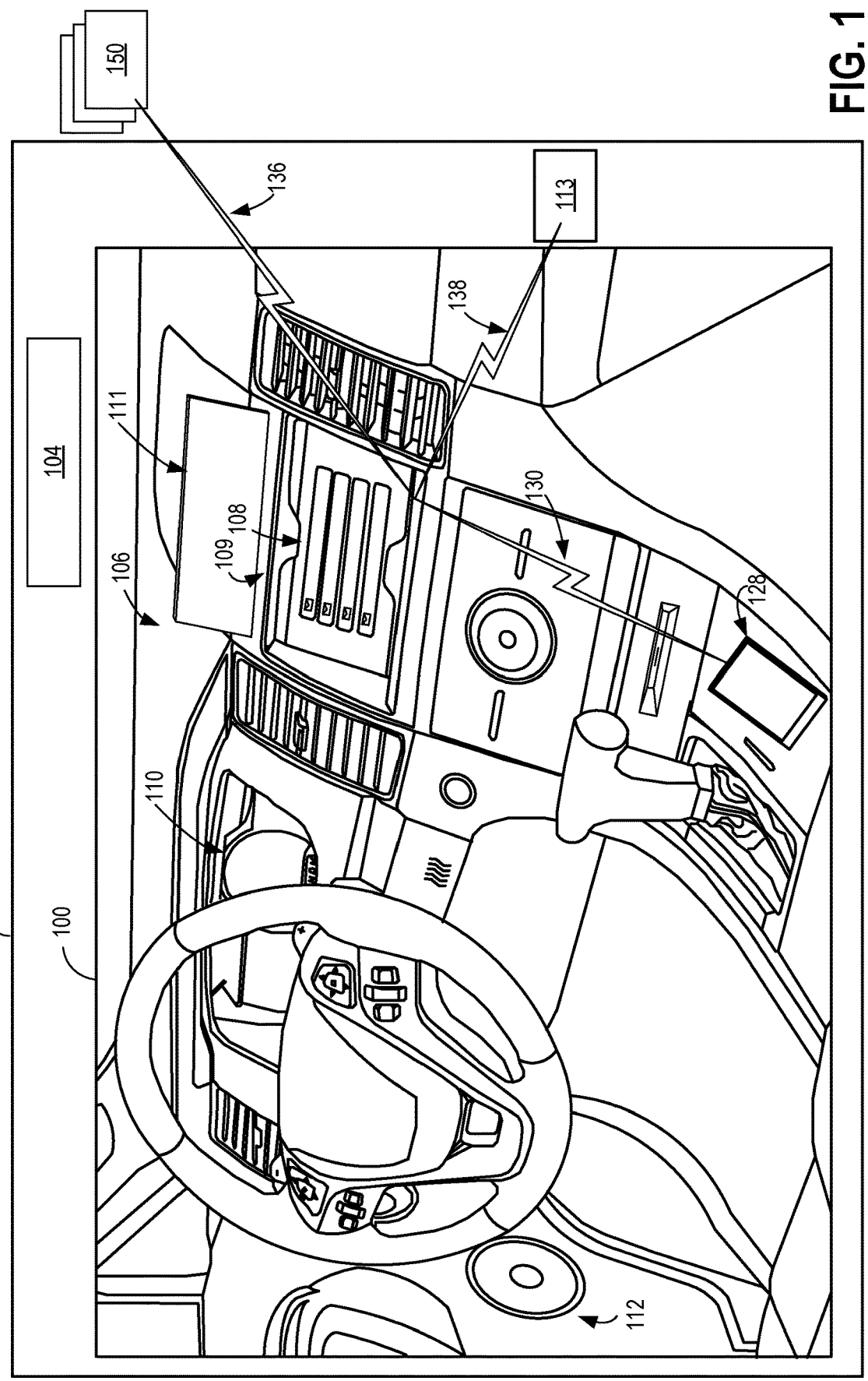
FIG. 1 shows an example partial view of a vehicle cabin in accordance with one or more embodiments of the present disclosure.
Figure 2:
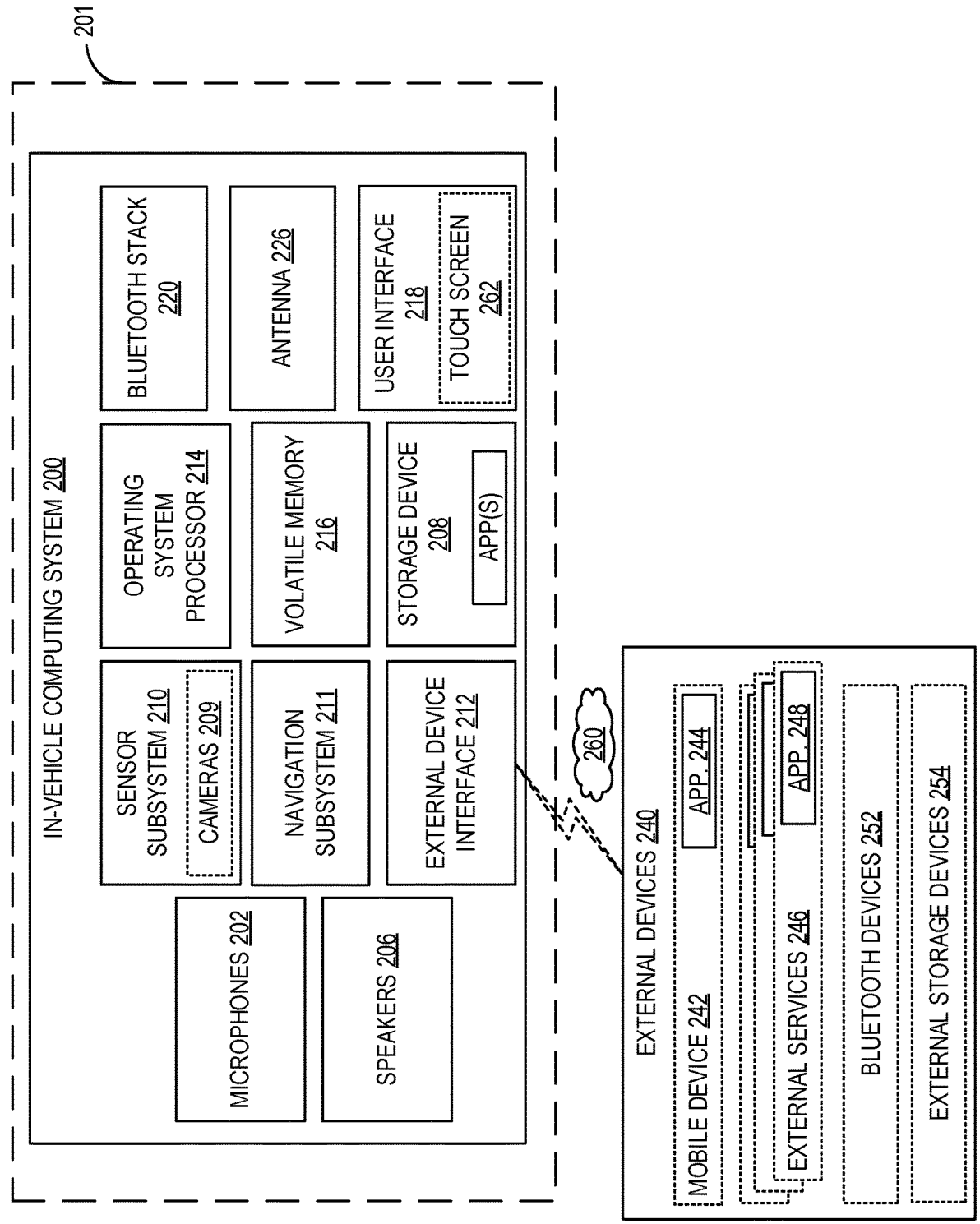
FIG. 2 shows a block diagram of an example in-vehicle computing system of a vehicle, in accordance with one or more embodiments of the present disclosure.
Figure 3:
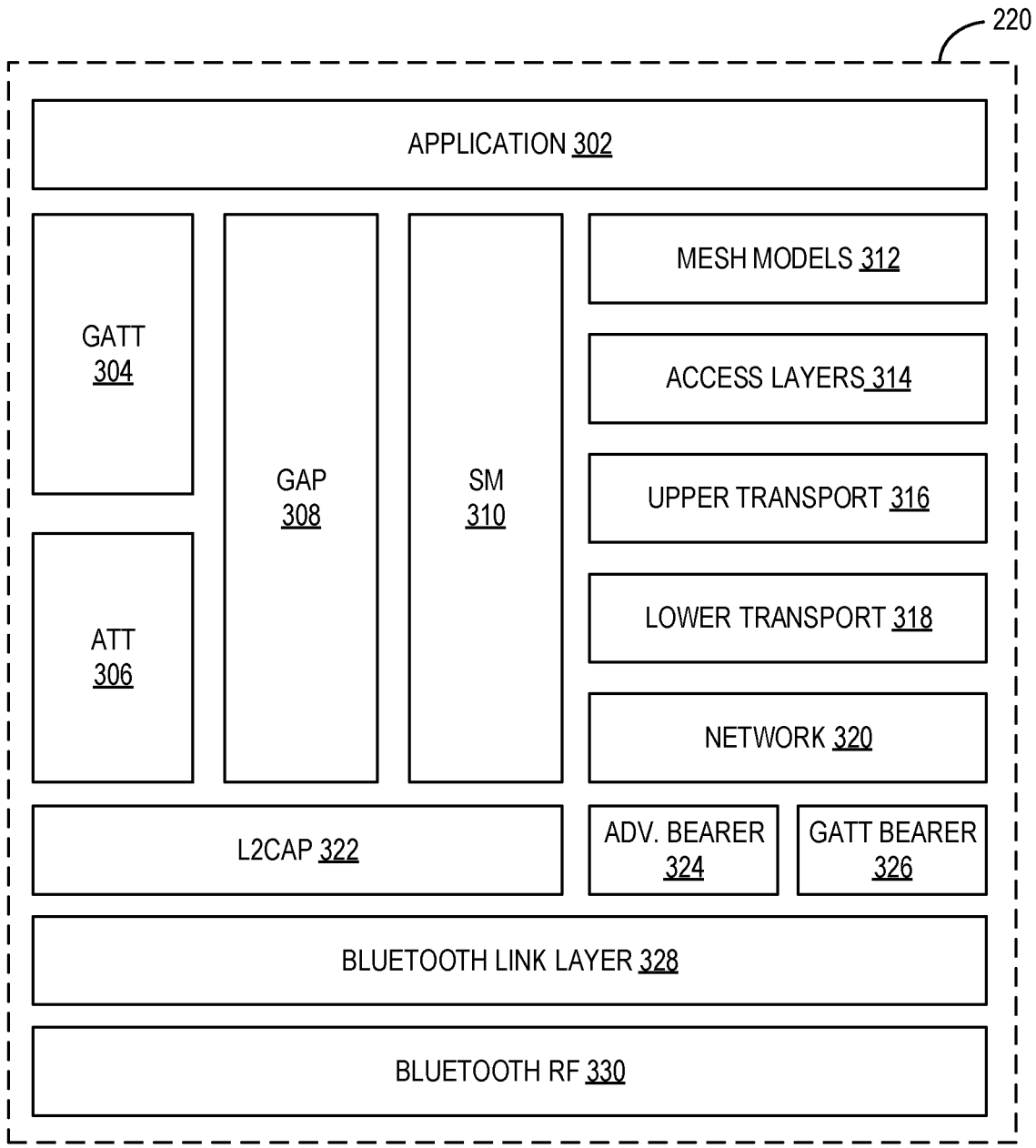
FIG. 3 shows a block diagram of a Bluetooth stack, such as may be included in the in-vehicle computing system of FIG. 2, according to an embodiment of the present disclosure.
Figure 4:
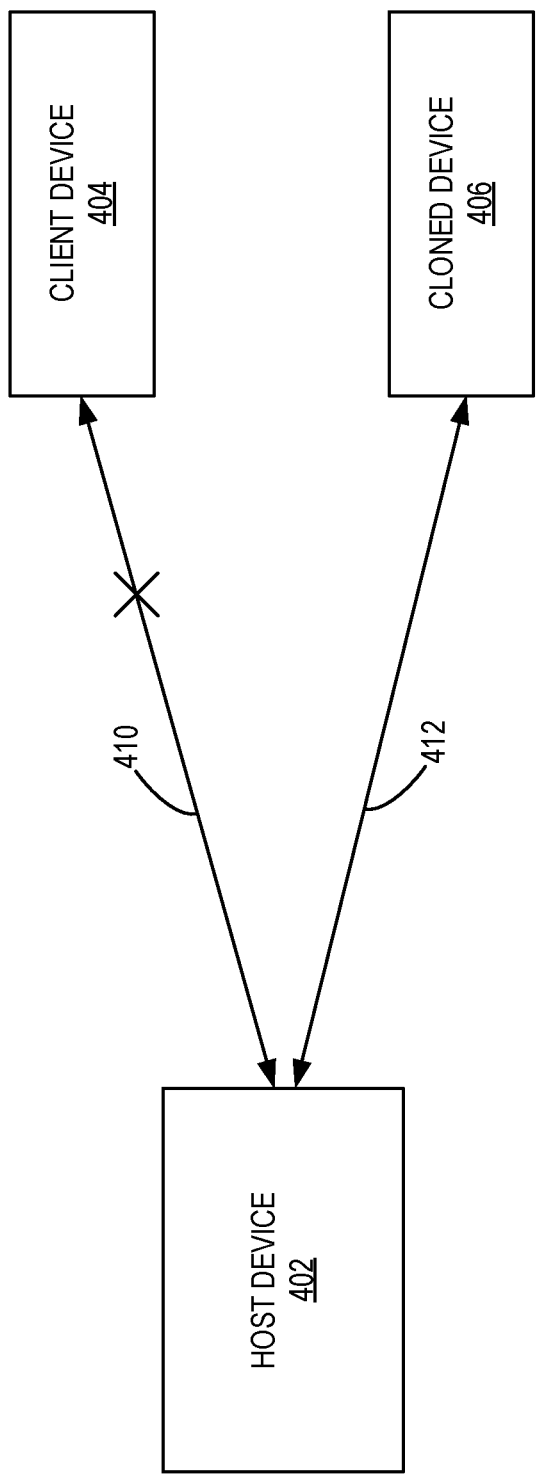
FIG. 4 shows a block diagram of a client device and a cloned device establishing Bluetooth connections with a host device, according to an embodiment of the present disclosure.
Figure 5A:
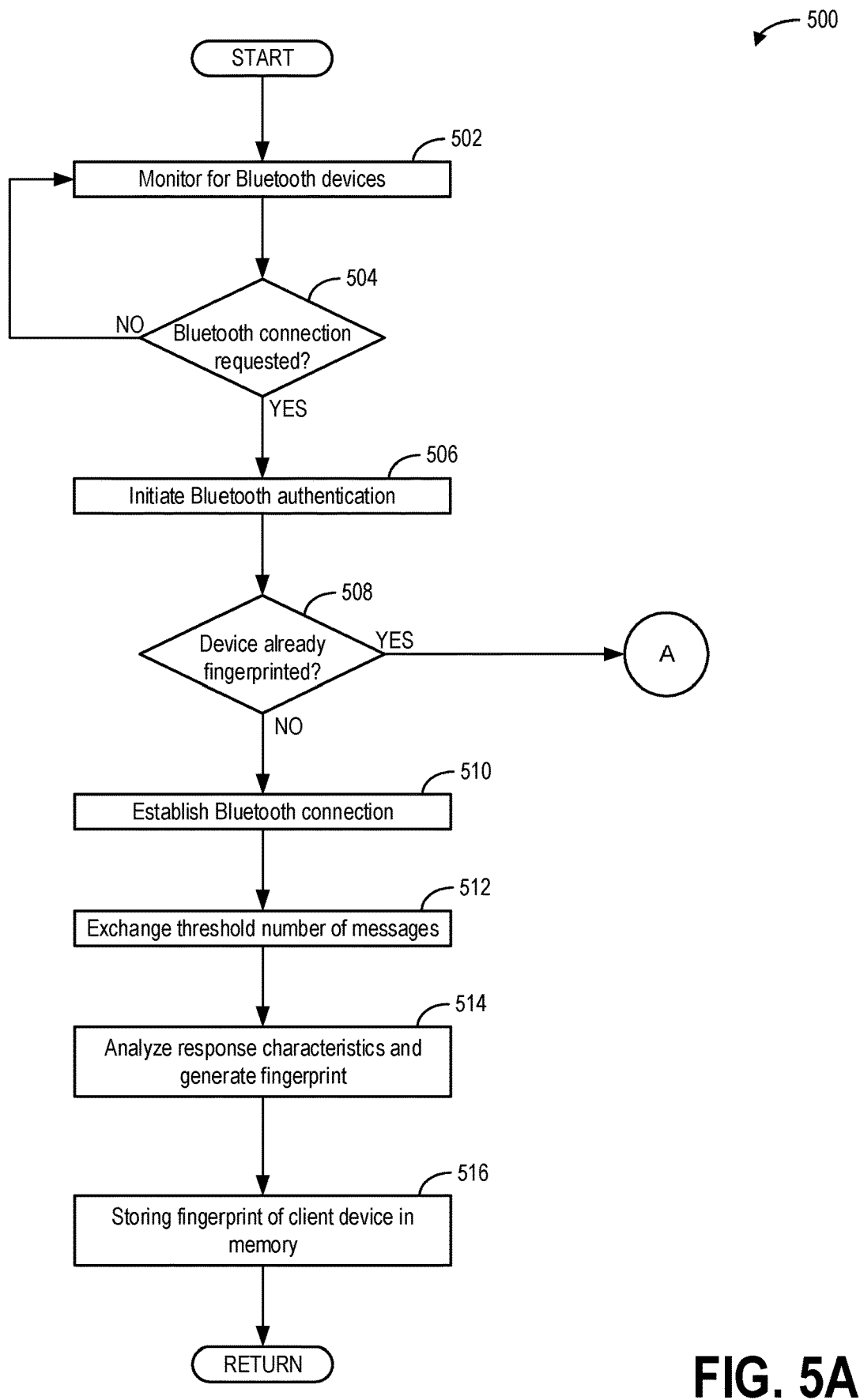
FIGS. 5A and 5B show a flowchart illustrating a method for generating a communication fingerprint of a client device, and verifying the client device based on the fingerprint, according to an embodiment of the present disclosure.
Figure 5B:
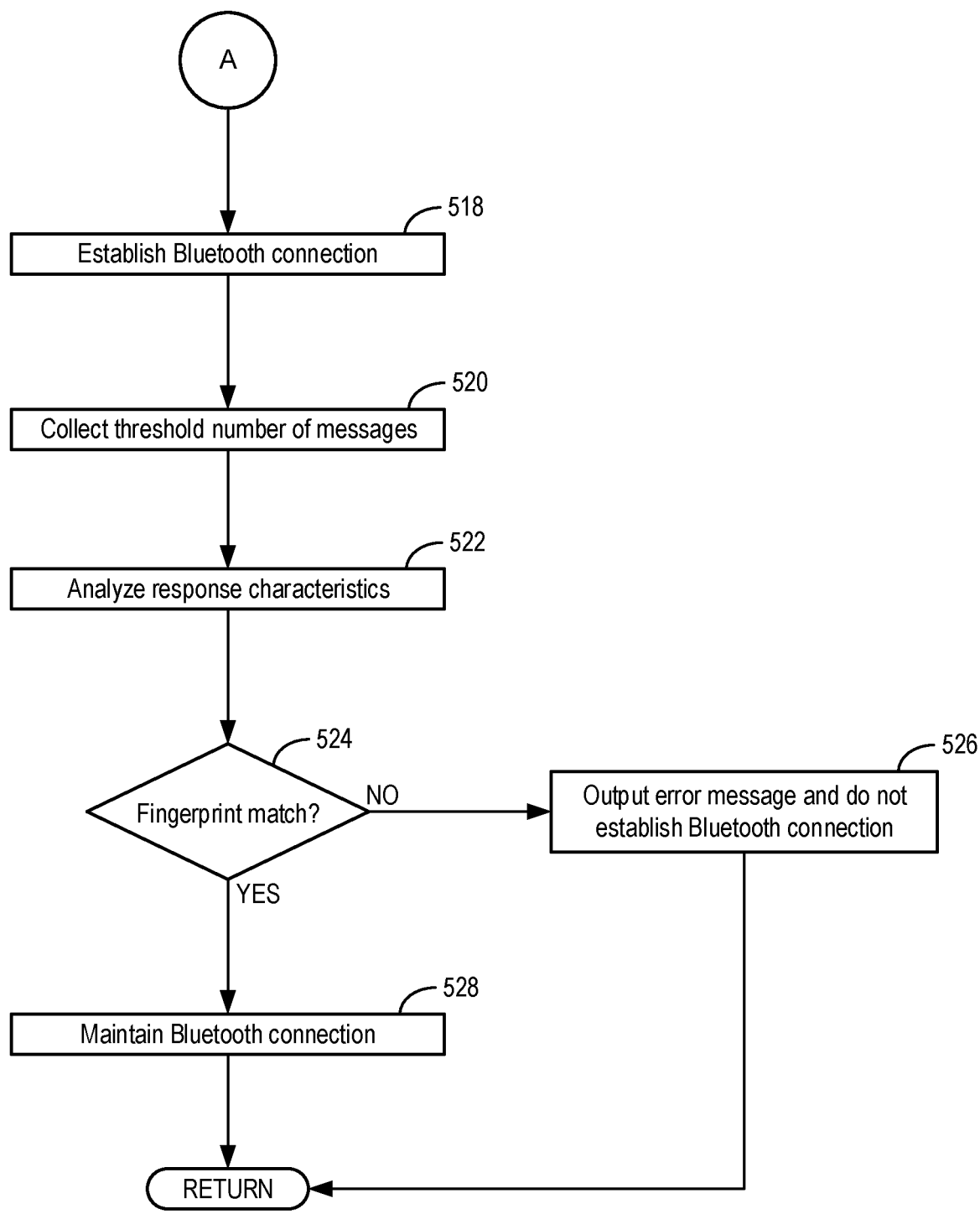

As described above, a computing system may establish a Bluetooth connection with a client device, and may analyze response characteristics of the client device in order to generate a communication fingerprint (e.g., a fingerprint) of the client device. For example, the fingerprint of the client device may be used for verifying the client device when establishing a subsequent Bluetooth connection. For example, by generating a unique fingerprint for the client device and verifying the client device during subsequent connections, security of the host device may be increased. In some examples, the computing system may be included in a vehicle system, such as depicted in FIGS. 1 and 2, and the client device may be a mobile phone of a user of the vehicle. In other examples, the computing system may not be a vehicle system, and may be another Bluetooth device, such as a Bluetooth speaker, a personal computing device, a smart appliance, and the like. For example, the computing device may include a Bluetooth stack, such as shown in FIG. 3. However, in some examples, a cloned device may attempt to connect to the computing device by cloning attributes of a previously connected client device, as shown in FIG. 4, which may decrease system security. In order to increase system security, a fingerprint for each client device may be generated, and each client device may be verified, as shown in the method of FIGS. 5A and 5B.

FIG. 1 shows an example partial view of one type of environment for a Bluetooth system: an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a human driver (also referred to as the user) of vehicle 102. For example, instrument panel 106 may include a user input device such as a touch screen 108 of an in-vehicle computing system 109 (e.g., an infotainment system), an audio system control panel, and an instrument cluster 110. Touch screen 108 may receive user input to the in-vehicle computing system 109 for controlling audio output, visual display output, user preferences, control parameter selection, etc. Further, additional user interfaces, not shown, may be present in other portions of the vehicle, such as proximate to at least one passenger seat. For example, the vehicle may include a row of back seats with at least one touch screen controlling the in-vehicle computing system 109. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128. For example, mobile device 128 may be a Bluetooth-enabled device, and may be configured to establish a Bluetooth connection with the in-vehicle computing system 109.

In addition, the in-vehicle computing system 109 may adjust audio output volume or power output level, which speakers are activated, and signals for generating sounds at speakers in response to output from sound processor for external sounds 113.

In some embodiments, one or more hardware elements of in-vehicle computing system 109, such as touch screen 108, a display screen 111, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system 109 may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct voice calls, and/or to measure ambient noise in the cabin 100, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 150 and/or mobile device 128.

Cabin 100 may also include one or more user objects, such as mobile device 128, that are stored in the vehicle before, during, and/or after travelling. The mobile device 128 may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link

[MHL], High-Definition Multimedia Interface [HDMI], Ethernet, etc.) or wireless (e.g., via Bluetooth, WIFI, WIFI direct, Near-Field Communication [NFC], cellular connectivity, etc.) and configured to provide two-way communication between the mobile device and the in-vehicle computing system. The mobile device 128 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smartwatch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, sound processor for external sounds 113, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

In some examples, the computing system (e.g., the host device) may not be included in a vehicle system, and may be included in other Bluetooth-enabled devices, such as Bluetooth speakers, Bluetooth appliances, personal computing devices, mobile devices, and the like. For example, the host device may be an Internet of Things (IoT) device, and may be configured to connect to one or more user device via a Bluetooth connection.

FIG. 2 shows a block diagram of an in-vehicle computing system 200 configured and/or integrated inside vehicle 102. In-vehicle computing system 200 may be an example of in-vehicle computing system 109 of FIG. 1 and/or may perform one or more of the methods described herein in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 102 in order to enhance an in-vehicle experience for a driver and/or a passenger. For example, in-vehicle computing system 200 is a host device for establishing Bluetooth connections with client devices. Further, in some examples, in-vehicle computing system 200 may be hosted at least in part on a cloud-based remote server, so that methods and functions or in-vehicle computing system 200 take place in the cloud-based remote server. As an example, in-vehicle computing system 200 may be hosted exclusively via the cloud-based remote server. As another example, some components of in-vehicle computing system 200 may run on the cloud-based remote server, while other components may be included in vehicle 102. The in-vehicle computing system 200 may be configured to receive inputs via user inputs such as buttons, touch screen, etc., of user interface 218. In particular, user interface 218 may include a touchscreen 262. For example, user interface 218 of in-vehicle computing system 200 may be directly coupled to vehicle 102, while an operating system processor 214 of in-vehicle computing system may be hosted on the cloud-based remote server.

In-vehicle computing system 200 may include one or more processors including the operating system processor 214. Operating system processor 214 may execute an operating system on the in-vehicle computing system, and control input/output, display, playback, and other operations of the in-vehicle computing system.

Further, a non-volatile storage device 208 may be included in in-vehicle computing system 200 to store data such as instructions executable by processor 214 in non-volatile form. The storage device 208 may store application data to enable the in-vehicle computing system 200 to run an application for connecting to a cloud-based server and/or collecting information for transmission to a cloud-based server. The application may retrieve information gathered by vehicle systems/sensors, input devices (e.g., user interface 218), devices in communication with the in-vehicle computing system (e.g., a mobile device connected via a Bluetooth link), etc. In-vehicle computing system 200 may further include a volatile memory 216. Volatile memory 216 may be random access memory (RAM). Non-transitory storage devices, such as non-volatile storage device 208 and/or volatile memory 216, may store instructions and/or code that, when executed by a processor (e.g., operating system processor 214), controls the in-vehicle computing system 200 to perform one or more of the actions described in the disclosure.

A microphone 202 may be included in the in-vehicle computing system 200 to receive voice commands from a user, to measure ambient noise in the vehicle, to determine whether audio from speakers of the vehicle is tuned in accordance with an acoustic environment of the vehicle, etc. A speech processing unit 204 may process voice commands, such as the voice commands received from the microphone 202. In some embodiments, in-vehicle computing system 200 may also be able to receive voice commands and sample ambient vehicle noise using a microphone included in an audio system of the vehicle.

One or more additional sensors may be included in a sensor subsystem 210 of the in-vehicle computing system 200. For example, the sensor subsystem 210 may include a camera, such as a rear view camera for assisting a user in parking the vehicle and/or a cabin camera for identifying a user (e.g., using facial recognition and/or user gestures). Sensor subsystem 210 of in-vehicle computing system 200 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230. A navigation subsystem 211 of in-vehicle computing system 200 may generate and/or receive navigation information such as location information (e.g., via a GPS sensor and/or other sensors from sensor subsystem 210), route guidance, traffic information, point-of-interest (POI) identification, and/or provide other navigational services for the driver.

External device interface 212 of in-vehicle computing system 200 may be coupleable to and/or communicate with one or more external devices 240 located external to vehicle 201. While the external devices are illustrated as being located external to vehicle 201, it is to be understood that they may be temporarily housed in vehicle 201, such as when the user is operating the external devices while operating vehicle 201. In other words, the external devices 240 are not integral to vehicle 201. The external devices 240 may include a mobile device 242 (e.g., connected via a Bluetooth, NFC, WIFI direct, or other wireless connection) or an alternate Bluetooth-enabled device 252. Mobile device 242 may be a mobile phone, smart phone, wearable devices/ sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc.

External devices 240 may communicate with in-vehicle computing system 200 either wirelessly or via connectors without departing from the scope of this disclosure. For example, external devices 240 may communicate with in-vehicle computing system 200 through the external device interface 212 over a network 260, a universal serial bus (USB) connection, a direct wired connection, a direct wireless connection, and/or other communication link.

The external device interface 212 may provide a communication interface to enable the in-vehicle computing system to communicate with mobile devices associated with contacts of the driver. For example, the external device interface 212 may enable phone calls to be established and/or text messages (e.g., SMS, MMS, etc.) to be sent (e.g., via a cellular communications network) to a mobile device associated with a contact of the driver. The external device interface 212 may additionally or alternatively provide a wireless communication interface to enable the in-vehicle computing system to synchronize data with one or more devices in the vehicle (e.g., the driver's mobile device) via WIFI direct One or more applications 244 may be operable on mobile device 242. As an example, mobile device application 244 may be operated to aggregate user data regarding interactions of the user with the mobile device. For example, mobile device application 244 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 244 to external device interface 212 over network 260. In addition, specific user data requests may be received at mobile device 242 from in-vehicle computing system 200 via the external device interface 212. The specific data requests may include requests for determining where the user is geographically located, an ambient noise level and/or music genre at the user's location, an ambient weather condition (temperature, humidity, etc.) at the user's location, etc. Mobile device application 244 may send control instructions to components (e.g., microphone, etc.) or other applications (e.g., navigational applications) of mobile device 242 to enable the requested data to be collected on the mobile device. Mobile device application 244 may then relay the collected information back to in-vehicle computing system 200.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Speakers 206 may include one or more acoustic reproduction devices including electromagnetic transducers such as speakers. Speakers 206 may be passive or active such as by including a power amplifier. In some examples, in-vehicle computing system 200 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

In-vehicle computing system 200 may further include an antenna 226. Antenna 226 may be a single antenna, or may comprise one or more antennae in some embodiments. The in-vehicle computing system may obtain broadband wireless internet access via antenna 226, and may further receive broadcast signals such as radio, television, weather, traffic, and the like. The in-vehicle computing system may receive positioning signals such as GPS signals via one or more antennae 226. The in-vehicle computing system may also receive wireless commands via RF such as via antenna(s) 206 or via infrared or other means through appropriate receiving devices. Additionally, antenna 226 may provide AM/FM radio signals to external devices 240 (such as to mobile device 242) via external device interface 212.

One or more elements of the in-vehicle computing system 200 may be controlled by a user via user interface 218. User interface 218 may include a graphical user interface presented on a touch screen, such as touch screen 108 of FIG. 2, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 200 and mobile device 242 via user interface 218. In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface. User preferences/information and/or responses to presented messages may be performed via user input to the user interface.

Further, in-vehicle computing system 200 includes a Bluetooth stack 220 for implementing a Bluetooth protocol. For example, Bluetooth stack 220 may be used to establish wireless Bluetooth connections between the in-vehicle computing system 200 and a client device, such as one or both of mobile device 242 and Bluetooth devices 252. For example, Bluetooth stack 220 may be configured to authenticate Bluetooth connections and provide Bluetooth data to applications.

FIG. 3 shows Bluetooth stack 220 in more detail. Bluetooth stack 220 includes an application layer 302. Application layer 302 may include applications that implement Bluetooth functionality, such as music streaming applications, voice call applications, and other applications with Bluetooth functionality. A Generic Attribute Profile (GATT) block 304 of Bluetooth stack 220 may include instructions for transferring data between devices once a Bluetooth connection is established between the host device and the client device. A Low-Energy Attribute Profile (ATT) block 306 may be an attribute profile adapted for low-energy Bluetooth connections. Further, a General Access Profile (GAP) block 308 may define a topology of the Bluetooth stack, and may define how the in-vehicle computing system may appear to other devices. In order to provide security, the Bluetooth stack 220 may include a security manager (SM) block 310 for managing security services. Further, mesh models 312 may be included for mesh networking. Further, Bluetooth stack includes access layers 314, upper transport 316, lower transport 318, a network 320, an advertising bearer 324, and a GATT bearer 326. Further, a logical link control and adaptation protocol (L2CAP) block 322 may multiplex data between different higher layer protocols. For example, the L2CAP block 322 may provide an interface for data applications in the Bluetooth stack 220. Further, a Bluetooth Link Layer 328 may be a lower level of the Bluetooth stack, and may control radio and timing of the Bluetooth communication. A Bluetooth RF layer 330 may be a physical layer of the Bluetooth stack, and may be a transmission path for converting data to radio packets and receiving radio signals from connected devices. In some examples, Bluetooth stack 220 may have a different architecture than described above. For example, alternative Bluetooth stack architectures may be used without departing from the scope of the present disclosure. As an example, any Bluetooth specification may be used, such as one of BT 5.2, BT, BT 5.0, BT 4.2, BT 4.1, BT 4.0, BT 3.0, BT 2.1, BT 2.0, BT Low Energy (BLE), and the like.

For example, using Bluetooth stack 220 and external device interface 212, in-vehicle computing system 200 may establish connections with other Bluetooth devices 252, such as a client device. Bluetooth protocols, such as defined by Bluetooth stack 220, includes a variety of security controls for authenticating and protecting a Bluetooth connection from unauthorized entities. However, in some examples the client device may be cloned (e.g., a cloned device), and the cloned device may attempt to connect to the in-vehicle computing system 200. FIG. 4 shows an example system including a host device 402, a client device 404, and a cloned device 406. For example, the client device 404 may establish a Bluetooth connection 410 with the host device 402 in order to exchange information. As an example, the client device may stream music to the host device 402 via Bluetooth connection 410. As another example, the client device may adjust settings of the host device via Bluetooth connection 410. However, the cloned device 406 may have a similar profile to the client device, and may appear as a duplicate of the client device to the host device 402. For example, if the host device 402 receives a connection request from the cloned device 406, the host device may de-authenticate the client device 404, and establish a connection with cloned device 406. For example, Bluetooth connection 410 may be terminated, and a Bluetooth connection 412 may be established between the host device 402 and the cloned device 406.

The inventors have recognized the above-mentioned issues and have developed systems and methods to at least partially address the above issues. As such, methods and systems are provided for generating a communication fingerprint of a client device connecting to a host device, the communication fingerprint based on response characteristics of the client device such as a time of flight (TOF) of messages and a response time of messages. By generating a unique communication fingerprint (e.g., a fingerprint) of the client device during an initial connection, the host device may verify the client device during subsequent connections based on the fingerprint. For example, the response characteristics may be based on communications passing through both of a physical layer of the client device and an application layer of the client device, so that different devices have distinct communication fingerprints. For example, it may be difficult for a cloned device to duplicate response characteristics of the client device. Further, response characteristics may be analyzed during response-request messages sent during Bluetooth initialization, so that additional communication between the client device and the host device is not requested. For example, verifying client devices with a unique communication fingerprint may increase system security, such as by preventing cloned devices from connecting to the host device and de-authenticating a client device.

Therefore, FIGS. 5A and 5B shows a method for generating a unique fingerprint for a Bluetooth device during a first connection to a host device, and for verifying a fingerprint of the Bluetooth device during a subsequent connection to the host device. In particular, method 500 is described with respect to the in-vehicle entertainment system of FIGS. 1 and 2, including in-vehicle computing system 200. For example, the host device may be in-vehicle computing system 200, and the client device may be a mobile phone of a user of the vehicle. However, in other examples, method 500 may be carried out by other computing systems configured for Bluetooth. Instructions for carrying out method 500 may be stored in non-transitory memory of the in-vehicle computing system (e.g., storage device 208 shown in FIG. 2). As such, method 500 may be executed by a processor (e.g., operating system processor 214 of FIG. 2) based on the stored instructions and in conjunction with a Bluetooth stack, such as the Bluetooth stack 220 described with respect to FIGS. 2 and 3.

At step 502, method 500 includes monitoring for client Bluetooth devices attempting to connect to the host device. For example, the host device may monitor for requests to establish a Bluetooth connection with another device. For example, other Bluetooth devices, such as a client device, may send a request to an RF layer of a Bluetooth stack of the host device to establish a Bluetooth connection.

At step 504, method 500 includes determining whether a Bluetooth connection is requested between a client device and the host device. For example, if a request to establish a Bluetooth connection is received, the controller may determine that a Bluetooth connection is requested between a client device and the host device. As an example, the client device may transmit a data packet to the in-vehicle computing system (e.g., the host device), which may be received by an RF layer of the host device (e.g., RF layer 330 shown in FIG. 3), in order to request a Bluetooth connection.

If method 500 determines that a Bluetooth connection is not requested with the host device ("NO"), method 500 returns to step 502 and includes continuing to monitor for Bluetooth devices. For example, the host device may continue to monitor for a request to establish a Bluetooth connection.

If method 500 determines that a Bluetooth connection is requested with the host device ("YES"), method 500 continues to step 506 and includes initiating a Bluetooth authentication process for the client device. For example, when a new connection is initiated, a plurality of messages may be exchanged between the host device and the client device in order to set various communication parameters. The plurality of messages may be sent before identification or key exchange is attempted, even if the client device has not previously been paired to the host device. In some examples, a portion of the plurality of messages may be located in one or both of a Host-Controller Interface (HCI) of the Bluetooth Stack and the L2CAP layer of the Bluetooth stack, and may have a request-response structure, in which a request is sent to the client device and a response is received from the client device.

At step 508, method 500 includes determining whether the client device has already been fingerprinted by the host device. For example, during the process of initiating the Bluetooth connection, the host device may determine whether the client device has previously been fingerprinted by the host device. For example, the host device may have a list of devices with fingerprints stored in controller memory, and may compare an identifier of the client device to the list of previously fingerprinted devices. If the client device is included in the list of previously fingerprinted devices, the controller may determine that the host device has previously been paired to the client. If the client device is not included in the list of previously fingerprinted devices, the controller may determine that the host device has not previously generated a fingerprint of the client device requesting a Bluetooth connection. Further, in some examples, if a threshold amount of time has passed since the last Bluetooth connection with the client device, the controller may repeat the process of generating a fingerprint for the client device.

If method 500 determines that the client device has not been fingerprinted by the host device ("NO"), method 500 continues to step 510 and includes establishing a Bluetooth connection. For example, because the host device has not already generated a fingerprint for the client device, the controller may not verify the client device based on a fingerprint, and may establish a Bluetooth connection with the client device. For example, the Bluetooth stack may include authentication protocols for authenticating the client device and establishing a secure wireless Bluetooth connection between the host device and the client device. Further, in parallel to establishing the Bluetooth connection, the controller continues to generate a communications fingerprint for the client device based on response characteristics of the client device.

At step 512, method 500 includes exchanging a threshold number of messages between the host device and the client device for generating a communications fingerprint of the client device. The communications fingerprint is based on response characteristics of communication between client device and host device through software layers and hardware elements of the client device. For example, characteristics of messages transmitted to and/or received from the client device may be based on physical and software characteristics of the client device. As an example, in order to analyze the response characteristics of the client device, the controller may monitor messages to and from the client device until the controller has collected a threshold number of messages. The threshold number of messages may be a pre-determined number of messages selected to analyze response characteristics of the client device, for example. As another example, the threshold number of messages may be dynamically determined based on a characteristic of the client device, such as based on a protocol for connecting with the client device. For example, because a number of messages are exchanged between the host device and the client device while initiating the Bluetooth connection, no additional messages are required to generate a fingerprint for the client device.

At step 514, method 500 includes analyzing response characteristics of the client device. For example, the host device is trained on messages exchanged between the host device and the client device via the Bluetooth connections in order to develop a fingerprint of the client device. For example, the controller may analyze characteristics of the messages, including a time of flight of the messages, a response time of the client device, and a delay time of the messages. In some example, the messages may be analyzed via one or more of deep learning (e.g., such as Auto Encoders deep learning), machine learning (e.g., such as Support Vector Machine [SVM] machine learning), and statistical tests (e.g., such as a Kolmogorov-Smirnov [KS] test). Therefore, the controller may generate a unique communication fingerprint of the client device based on the response characteristics of the client device.

At step 516, method 500 includes storing the fingerprint of the client device in memory. In some examples, the fingerprint of the client device may be stored in controller memory, and may be indexed to an identifier of the client device. In other examples, the fingerprint of the client device may be stored in a remote location, such as a remote server or a cloud server.

If method 500 determines that the device is already fingerprinted at step 508 ("YES"), method 500 continues to A, shown in FIG. 5B. At A, method 500 includes step 518. At step 518, method 500 includes establishing a Bluetooth connection with the client device. Further, in parallel to establishing the Bluetooth connection, the controller continues to analyze response characteristics of the client device via the Bluetooth connection in order to determine whether the response characteristics of the client device match with the stored fingerprint for the client device.

At step 520, method 500 includes collecting a threshold number of messages for verifying a fingerprint of the client device. For example, after the controller determines that a fingerprint for the client device is already stored in memory, the controller may collect the threshold number of messages between the client device and the host device. For example, the threshold number of messages may be a pre-determined number of messages for verifying the fingerprint of the client device. As another example, the threshold number of messages may be determined based on a characteristic of the client device.

At step 522, method 500 includes analyzing response characteristics of the client device. In particular, the controller may analyze the characteristics in order to compare response characteristics of the client device to response characteristics from the client device during previous instances of Bluetooth connection to the client device. For example, the controller may analyze characteristics of the messages, such as by generating a communication fingerprint of the client device and comparing the communication fingerprint of the client device to a stored communication fingerprint of the client device. The communication fingerprint of the client device may be generated based on a time of flight of the messages and a delay of the messages using one or more of deep learning, machine learning, and statistical tests (e.g., such as the KS test). In other examples, the controller may compare characteristics of each message to the stored communication fingerprint of the client device in order to determine if a threshold number of messages match the communication fingerprint of the client device.

At step 524, method 500 includes determining whether the response characteristics of the client device match with the stored fingerprint of the client device. For example, the controller may compare the response characteristics of the client device to fingerprint of the client device stored in controller memory. For example, the controller may compare time of flight and delay for each message from the client device to the fingerprint of the client device in order to determine whether the characteristics of the client device align with the stored fingerprint of the client device. As an example, a set of probabilities and thresholds may be used to evaluate a similarity between the response characteristics of the client device and the stored fingerprint of the client device. In one embodiment, the probability thresholds may be trained offline in a supervised manner against fraud devices. In another embodiment, the probability thresholds may be self-trained or self-supervised, such as by splitting the original fingerprint into multiple time-delay groups of messages and tuning the probability thresholds by reaching authentication when evaluating the classifiers (e.g., via machine learning, deep learning, or statistical analysis) against the groups of messages.

If method 500 determines that the message characteristics do not match with the stored fingerprint of the client device ("NO") at step 524, method 500 continues to step 526 and includes outputting an error message and not establishing a Bluetooth connection with the client device. For example, if the controller determines that the message characteristics of the client device to not match with the stored fingerprint of the client device, the controller may not verify the client device. As an example, the client device may be cloned from the previously verified and fingerprinted device. As such, the controller may not establish a secure Bluetooth connection with the client device. Further, the controller may output an error message. For example, the controller may output an error message to a vehicle user. As another example, the controller may output an error message to a remote service. In some examples, the controller may re-set the host device. Method 500 may then end.

If method 500 determines that the message characteristics do match with the stored fingerprint of the client device ("YES") at step 524, method 500 continues to step 528 and includes maintaining the Bluetooth connection with the client device. For example, if the controller determines that the message characteristics from the client device do match with the stored fingerprint of the client device, the controller verifies the client device and maintains a secure Bluetooth connection for sharing data. For example, by verifying the client device with the stored fingerprint, the controller may reduce an incidence of cloned devices connecting to the host device. Method 500 may then end.

In this way, a client device may be verified in order to decrease an incidence of cloned devices establishing a connection with a host device, which may increase system security. As an example, the host device is an in-vehicle infotainment system of a vehicle, and the client device is a mobile device of a user of the vehicle. For example, during an initial connection with a client device, a host device may generate a fingerprint of the client device, the fingerprint based on response characteristics of the client device. For example, the response characteristics of the client device may be a function of physical characteristics of the client device and a system architecture of the client device. Thus, during a subsequent reconnection with the client device, the host device may compare response characteristics to the fingerprint of the client device in order to verify that the client device is authentic, and the host device may prevent inauthentic devices from connecting. Therefore, Bluetooth connection security may be increased, an incidence of inauthentic connections may be decreased, and overall customer satisfaction may be increased.

The technical effect of the disclosure is that a communication fingerprint based on response characteristics of a client device may be generated and stored by a host device, and may be used to verify a Bluetooth connection between the host device and the client device in order to increase security of the Bluetooth connection.

As an example, a method comprises: at a computing system, responsive to initiating a wireless connection between a client device and a host device, generating a communication fingerprint of the client device based on at least one response characteristic of the client device, the at least one response characteristic based on a communication between the client device and the host device, the communication passing through each of a software layer of the client device and a hardware element of the client device. In the preceding example, additionally or optionally, initiating the wireless connection between the client device and the host device includes determining whether a saved communication fingerprint for the client device is stored in a memory of the computing system. In one or both of the preceding examples, additionally or optionally, responsive to determining that the saved communication fingerprint of the client device is stored in the memory of the computing system, comparing the communication fingerprint of the client device to the saved communication fingerprint of the client device. In any or all of the preceding examples, additionally or optionally, responsive to the communication fingerprint of the client device not matching the saved communication fingerprint of the client device, terminating the wireless connection and outputting an error message. In any or all of the preceding examples, additionally or optionally, responsive to the communication fingerprint of the client device matching the saved communication fingerprint of the client device, verifying the client device and maintaining the wireless connection between the client device and the host device. In any or all of the preceding examples, additionally or optionally, the at least one response characteristic of the client device includes one or more of a response time of the client device, a time of flight for a message to the client device, a time of flight for a message from the client device, and a delay time of the client device. In any or all of the preceding examples, additionally or optionally, the host device is one of a mobile phone, a personal computer, a wearable device, an MP3 player, a Bluetooth speaker, a Bluetooth-enabled appliance, an in-vehicle infotainment system, an in-vehicle computing system, and a tablet computer. In any or all of the preceding examples, additionally or optionally, the client device is one of a mobile phone, a personal computer, a wearable device, an MP3 player, a Bluetooth speaker, a Bluetooth-enabled appliance, an in-vehicle infotainment system, an in-vehicle computing system, and a tablet computer. In any or all of the preceding examples, additionally or optionally, the client device includes a client Bluetooth stack and the host device includes a host Bluetooth stack, each of the client Bluetooth stack and the host Bluetooth stack including an application layer and an RF layer.

As another example, a method for a computing system comprises: responsive to initiating a Bluetooth connection between a host device and a client device, determining whether a saved communications fingerprint for the client device is stored in a memory of the computing system; responsive to determining that the saved communications fingerprint for the client device is not stored in the memory of the computing system, generating a new communications fingerprint for the client device based on response characteristics of the client device and storing the new communications fingerprint in the memory of the computing system; responsive to determining that the saved communications fingerprint for the client device is stored in the memory of the computing system, comparing the response characteristics of the client device to the saved communications fingerprint; and responsive to determining that the response characteristics of the client device do not match the saved communications fingerprint, terminating the Bluetooth connection with the client device. In the preceding example, additionally or optionally, the response characteristics include a request-response communication delay of communication between the computing system and the client device. In one or both of the preceding examples, additionally or optionally, the response characteristics include one or more of a time of flight of a message from the client device, a time of flight of a message to the client device, a delay time of a message from the client device, and a delay time of a message from the client device. In any or all of the preceding examples, additionally or optionally, responsive to determining that the response characteristics of the client device match the saved communications fingerprint, maintaining the Bluetooth connection with the client device. In any or all of the preceding examples, additionally or optionally, terminating the Bluetooth connection with the client device responsive to determining that the response characteristics of the client device do not match the saved communications fingerprint includes outputting an error message to a user. In any or all of the preceding examples, additionally or optionally, the computing system is coupled to the host device.

As yet another example, a computing system comprises: a Bluetooth stack including an RF layer and an application layer; a processor communicatively coupled to the computing system; and a storage device storing instructions executable by the processor to: responsive to initiating a Bluetooth connection with a client device, generate a first communication fingerprint for the client device based on response characteristics of the client device. In the preceding example, additionally or optionally, to generate the first communication fingerprint for the client device based on the response characteristics of the client device, the storage device stores further instructions executable by the processor to: responsive to determining that a second communication fingerprint indexed to the client device is stored in memory, compare the first communication fingerprint to the second communication fingerprint; and responsive to the first communication fingerprint not matching to the second communication fingerprint, terminating the Bluetooth connection and de-authenticating the client device. In one or both of the preceding examples, additionally or optionally, to generate the first communication fingerprint for the client device based on the response characteristics of the client device, the storage device stores further instructions executable by the processor to: responsive to determining that a second communication fingerprint indexed to the client device is not stored in memory, save the first communication fingerprint and index the first communication fingerprint to the client device. In any or all of the preceding examples, additionally or optionally, the first communication fingerprint is saved in non-volatile memory of the computing system. In any or all of the preceding examples, additionally or optionally, the computing system is included in a motor vehicle.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The methods may be performed by executing stored instructions with one or more logic devices (e.g., processors)

in combination with one or more additional hardware elements, such as storage devices, memory, hardware network interfaces/antennae, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

The systems may include additional or different logic and may be implemented in many different ways. A controller may be implemented as a microprocessor, microcontroller, application specific integrated circuit (ASIC), discrete logic, or a combination of these and/or other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instruction sets may be parts of a single program, separate programs, or distributed across several memories and processors. The systems may be included in a wide variety of electronic devices, including a cellular phone, a headset, a hands-free set, a speakerphone, communication interface, or an infotainment system.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method, comprising:
    at a computing system, responsive to initiating a wireless connection between a client device and a host device, generating a communication fingerprint of the client device based on a communication between the client device and the host device, the generated communication fingerprint of the client device being based on at least one of:
        a response time of the client device that is based on the passing of the communication through both a physical layer of the client device and an application layer of the client device,
        a time of flight for a message to the client device that is based on the passing of the communication through both the physical layer of the client device and the application layer of the client device,
        a time of flight for a message from the client device that is based on the passing of the communication through both the physical layer of the client device and the application layer of the client device, and
        a delay time of the client device that is based on the passing of the communication through both the physical layer of the client device and the application layer of the client device,
    wherein the client device has one or more identifier attributes;
    wherein initiating the wireless connection between the client device and the host device includes determining whether a saved communication fingerprint indexed to the one or more identifier attributes of the client device is stored in a memory of the computing system;
    wherein responsive to determining that the saved communication fingerprint indexed to the one or more identifier attributes of the client device is stored in the memory of the computing system, comparing the generated communication fingerprint of the client device to the saved communication fingerprint;
    wherein responsive to the generated communication fingerprint of the client device not matching the saved communication fingerprint indexed to the one or more identifier attributes of the client device for at least a threshold number of the pre-determined number of messages, terminating the wireless connection and outputting an error message; and
    wherein the threshold number is at least one of:
        dynamically determined based on a protocol for connecting with the client device;
        determined based on a characteristic of the client device; and
        determined based on a protocol of the client device.

2. The method of claim 1, wherein responsive to the generated communication fingerprint of the client device not matching the saved communication fingerprint indexed to the one or more identifier attributes of the client device, terminating the wireless connection and outputting an error message.

3. The method of claim 1, wherein responsive to the generated communication fingerprint of the client device matching the saved communication fingerprint indexed to the one or more identifier attributes of the client device, verifying the client device and maintaining the wireless connection between the client device and the host device.

4. The method of claim 1, wherein the client device includes a client Bluetooth stack and the host device includes a host Bluetooth stack, each of the client Bluetooth stack and the host Bluetooth stack including an application layer and a physical layer.

5. A method for a computing system, comprising:
    responsive to initiating a Bluetooth connection between a host device and a client device having one or more identifier attributes, determining whether a saved communications fingerprint indexed to the one or more identifier attributes of the client device is stored in a memory of the computing system;
    responsive to determining that a saved communications fingerprint indexed to the one or more identifier attributes of the client device is not stored in the memory of the computing system storing the new communications fingerprint in the memory of the computing system;
    responsive to determining that a saved communications fingerprint indexed to the one or more identifier attributes of the client device is stored in the memory of the computing system, for each message of a pre-determined number of messages, generating a new communications fingerprint indexed to the one or more identifier attributes of the client device based on response characteristics of the client device, and comparing new communications fingerprint to the saved communications fingerprint; and responsive to determining that the new communications fingerprint does not match the saved communications fingerprint for at least a threshold number of the pre-determined number of messages, terminating the Bluetooth connection with the client device, wherein the response characteristics of the client device include one or more of a time of flight of a message to the client device, a time of flight of a message from the client device, and a delay time of a message from the client device;

wherein the response characteristics of the client device are based on both the passing of one or more communications through an application layer of the client device, and the passing the one or more communications through a physical layer of the client device; and wherein the threshold number is dynamically determined based on a protocol for connecting with the client device.

6. The method of claim 5, wherein the response characteristics include a request-response communication delay of communication between the computing system and the client device.

7. The method of claim 5, wherein responsive to determining that the new communications fingerprint matches the saved communications fingerprint for at least the threshold number of the pre-determined number of messages, maintaining the Bluetooth connection with the client device.

8. The method of claim 5, wherein terminating the Bluetooth connection with the client device responsive to determining that the new communications fingerprint does not match the saved communications fingerprint for at least a threshold number of the pre-determined number of messages includes outputting an error message to a user.

9. The method of claim 5, wherein the computing system is coupled to the host device.

10. The method of claim 5, wherein the threshold number is determined based on at least one of: a characteristic of the client device; and a protocol of the client device.

11. A computing system, comprising:
a processor communicatively coupled to the computing system; and
a storage device storing instructions executable by the processor to:
responsive to initiating a Bluetooth connection with a client device having one or more identifier attributes, generate a first communication fingerprint indexed to the one or more identifier attributes of the client device based on response characteristics of the client device including both physical characteristics of the client device and software characteristics of the client device;
responsive to determining that a second communication fingerprint indexed to the one or more identifier attributes of the client device is stored in memory, for each message of a pre-determined number of messages, generate a new communications fingerprint indexed to the one or more identifier attributes of the client device based on response characteristics of the client device, and compare the first communication fingerprint to the second communication fingerprint; and
responsive to the first communication fingerprint not matching the second communication fingerprint for at least a threshold number of the pre-determined number of messages, terminating the Bluetooth connection and de-authenticating the client device,
wherein the response characteristics of the client device include one or more of a time of flight of a message to the client device, a time of flight of a message from the client device, and a delay time of a message from the client device;
wherein the response characteristics of the client device are based on the passing of one or more communications through an RF layer of a Bluetooth stack of the client device;
wherein the response characteristics of the client device are additionally based on the passing of the one or more communications through an application layer of a Bluetooth stack of the client device;
wherein the threshold number is determined based on at least one of: a pre-determined number of messages for analyzing response characteristics of the client device; and a pre-determined number of messages for verifying the first communication fingerprint of the client device; and
wherein the threshold number is determined based on at least one of: a characteristic of the client device; and a protocol of the client device.

12. The computing system of claim 11, wherein the storage device stores further instructions executable by the processor to:
responsive to determining that a second communication fingerprint is not stored in memory, save the first communication fingerprint and index the first communication fingerprint to the one or more identifier attributes.

13. The computing system of claim 12, wherein the first communication fingerprint is saved in non-volatile memory of the computing system.

14. The computing system of claim 11, wherein the computing system is included in a motor vehicle.

15. The computing system of claim 11,
wherein the threshold number is dynamically determined based on a protocol for connecting with the client device.

* * * * *